United States Patent [19]
Yoshimoto et al.

[11] Patent Number: 5,818,004
[45] Date of Patent: Oct. 6, 1998

[54] GAS-INSULATED TRANSMISSION LINE HAVING RESERVE CIRCUIT FOR RECOVERING INSULTING GAS

[75] Inventors: Hiroshi Yoshimoto; Masatomo Ohno; Tetsuo Kanazawa, all of Hitachi, Japan

[73] Assignee: Hitachi, Ltd., Tokyo, Japan

[21] Appl. No.: 671,253

[22] Filed: Jun. 26, 1996

[30] Foreign Application Priority Data

Jun. 30, 1995 [JP] Japan .................................. 7-165139

[51] Int. Cl.⁶ .......................... H01H 33/18; H02H 5/00
[52] U.S. Cl. ............................................. 218/43; 361/605
[58] Field of Search ............................... 361/42, 44, 47, 361/48, 62, 63, 602, 604, 605, 612; 218/75, 43, 80, 84, 143, 144, 154

[56] References Cited

U.S. PATENT DOCUMENTS

| | | | |
|---|---|---|---|
| 3,654,409 | 4/1972 | Kessler | 200/48 R |
| 4,190,733 | 2/1980 | Wootton | 174/28 |
| 4,933,802 | 6/1990 | Haginoya et al. | 361/48 |
| 5,581,439 | 12/1996 | Hachida et al. | 361/612 |

*Primary Examiner*—Michael L. Gellner
*Assistant Examiner*—Michael Hayes
*Attorney, Agent, or Firm*—Fay, Sharpe, Beall, Fagan, Minnich & McKee

[57] ABSTRACT

In a gas-insulated transmission line for transmitting electric power between the substations, a bus change-over disconnecting switch for connection to a reserve circuit is provided at a portion where the gas-insulated transmission line is connected to a gas-insulated switchgear in order to improve reliability, and a first circuit and a second circuit are connected to the reserve circuit by using the change-over disconnecting switch. Therefore, even if grounding fault occurs on the two circuits at worst, transmission of electric power is reliably maintained without causing power failure.

12 Claims, 2 Drawing Sheets

GAS-INSULATED TRANSMISSION LINE HAVING RESERVE CIRCUIT FOR RECOVERING INSULTING GAS

BACKGROUND OF THE INVENTION

FIELD OF THE INVENTION

The present invention relates to a gas-insulated transmission line connected between the gas-insulated switchgears and, particularly, to a gas-insulated transmission line featuring improved reliability in case of accident.

A conventional gas-insulated transmission line for transmitting electric power from a substation to another substation employs a back-up system which consists of two circuits, i.e., a first circuit 13 and a second circuit 15 as shown in FIG. 3 in order to maintain improved reliability. Therefore, even in case one circuit becomes defective, the other circuit is used to transmit 100% of electric power permitting the defective circuit to be recovered.

In case a trouble such as ground fault or the like occurs, the above-mentioned prior art makes it possible to deal with the matter relatively easily provided the facilities are installed above the ground. When the gas-insulated transmission line is laid in a tunnel, however, an extended period of time is required for the restoration from the standpoint of operation efficiency.

SUMMARY OF THE INVENTION

The object of the present invention is to solve the above-mentioned defect inherent in the prior art by providing a gas-insulated transmission line capable of reliably transmitting electric power without interrupting the whole circuits even if two circuits suffers ground fault at worse.

In order to accomplish the above-mentioned object, the present invention deals with a gas-insulated transmission line having a plurality of gas-insulated switchgears and a gas-insulated transmission circuit for transmitting electric power among the gas-insulated switchgears, wherein the gas-insulated transmission circuit comprises a first circuit, a second circuit and a reserve circuit, and the reserve circuit, the first circuit and the second circuit are connected together via a change-over disconnecting switch.

The invention further deals with a gas-insulated transmission line wherein the first circuit and the second circuit are, respectively, connected to a main bus via a line disconnecting switch, a circuit breaker and a bus disconnecting switch, and the reserve circuit is connected, via the line disconnecting switch, circuit breaker and change-over disconnecting switch, to a branch bus between the bus disconnecting switch and the circuit breaker for the first and second circuits.

The invention is concerned with a gas-insulated transmission line wherein if an accident occurs on the first or second circuit, the circuit is disconnected, and the reserve circuit is connected to said main bus instead.

Owing to the above-mentioned constitution, a circuit on which accident has occurred is changed over to a normal circuit of the transmission line. Accordingly, even when, for example, ground fault occurs on a first circuit and occurs again on a second circuit, the probability of power failure is reduced substantially to zero and the electric power is safely supplied.

DETAILED DESCRIPTION OF THE PREFERRED EMBODIMENTS

Figure 1:
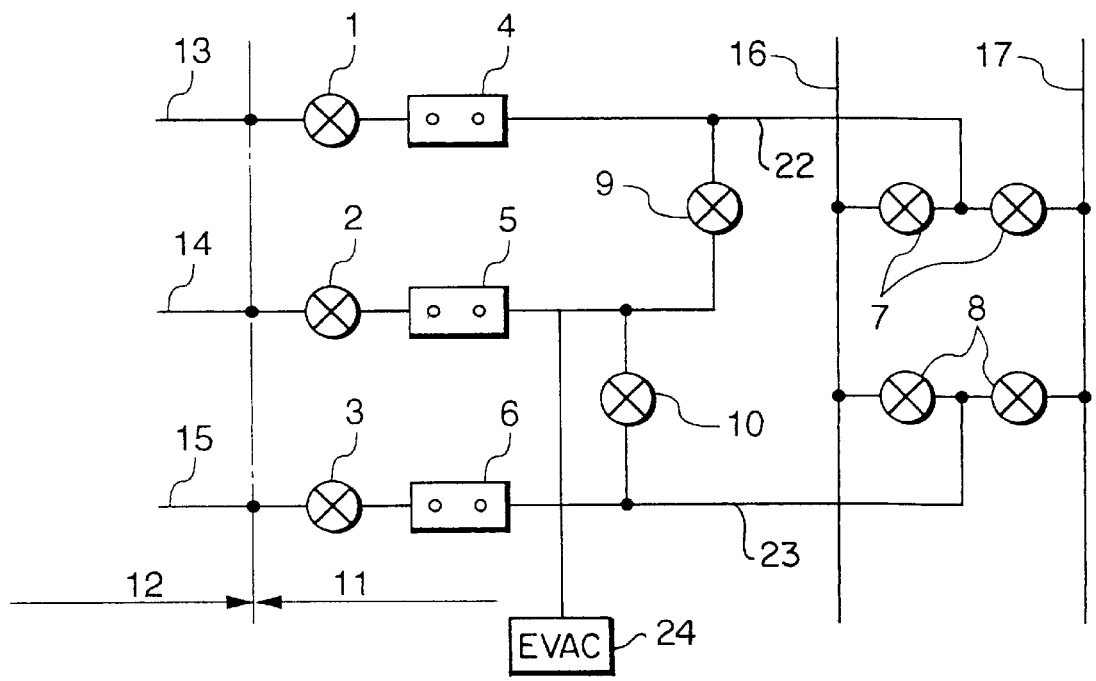
FIG. 1 is a skeleton diagram of a gas-insulated transmission line according to an embodiment of the present invention.

An embodiment of the present invention will now be described with reference to the drawings wherein FIG. 1 is a skeleton diagram of a gas-insulated transmission line according to the embodiment.

Referring to FIG. 1, a gas-insulated transmission line 12 provided in a section of arrow is connected to a gas-insulated switchgear 11 indicated by arrow, the other side of the gas-insulated transmission line 12 being connected to another gas-insulated switchgear (not shown). The gas-insulated transmission line 12 comprises a first circuit 13, a second circuit 15 and a reserve circuit 14 therebetween at a portion where it is connected to the gas-insulated switchgear 11. In the gas-insulated switchgear 11 are arranged a main bus (first side) 16 with three phases as a unit and a main bus (second side) 17 with three phases as a unit. A line disconnecting switch 1 and a circuit breaker 4 are connected in this order between the first circuit 13 and the main buses 16, 17 with three phases as a unit. The first circuit 13 is further connected to the main bus (first side) 16 with three phases as a unit via a bus disconnecting switch 7 as well as to the main bus (second side) 17 with three phases as a unit via a bus disconnecting switch 7. Similarly, a line disconnecting switch 3 and a circuit breaker 6 are connected in this order between the second circuit 15 and the main buses 16, 17 with three phases as a unit. The second circuit 15 is further connected to the main bus (first side) 16 with three phases as a unit via a bus disconnecting switch 8 as well as to the main bus (second side) 17 with three phases as a unit via a bus disconnecting switch 8. To the reserve circuit 14 are connected a line disconnecting switch 2 and a circuit breaker 5 in this order. The reserve circuit 14 is further connected, via a change-over disconnecting switch 9, to a branch bus 22 between the circuit breaker 4 and the bus disconnecting switch 7 and is connected, via a change-over disconnecting switch 10, to a branch bus 23 between the circuit 6 and the bus disconnecting switch 8.

Figure 2:
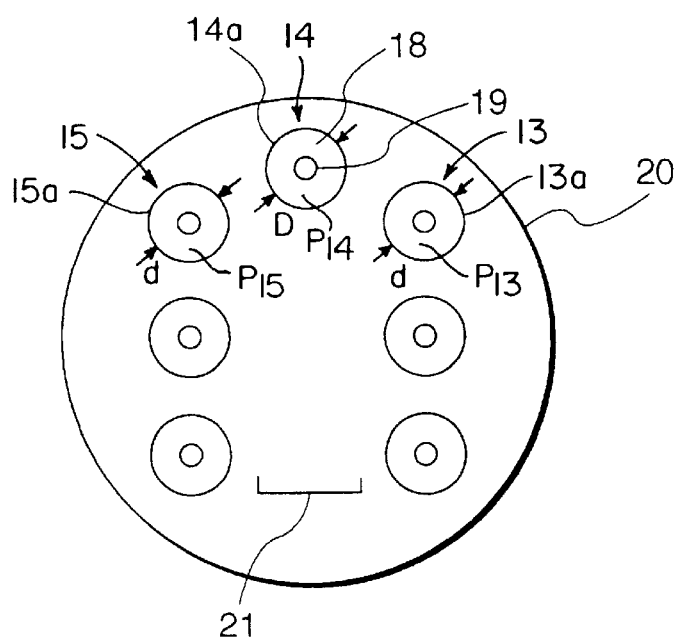
FIG. 2 is a sectional view illustrating the arrangement of circuits in a tunnel.
Figure 3:
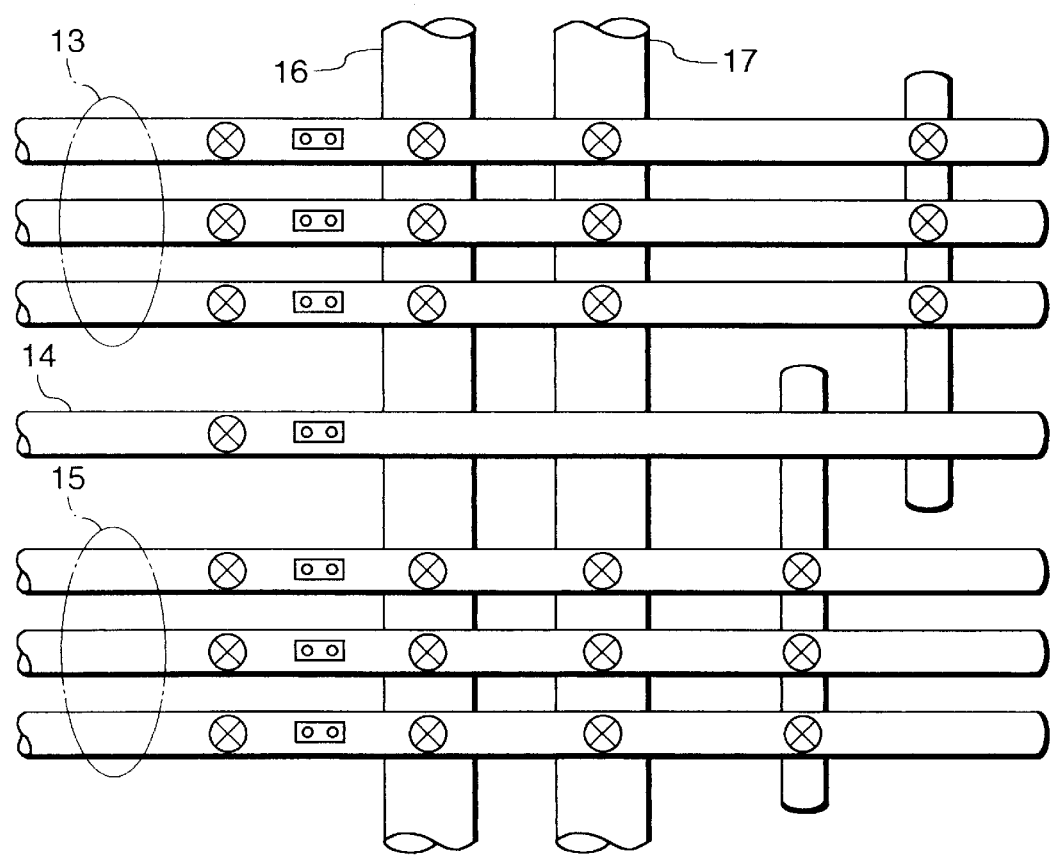
FIG. 3 is a diagram illustrating the arrangement of the gas-insulated transmission line and gas-insulated switchgear.

FIG. 2 is a sectional view of a gas-insulated transmission line 12 laid in a tunnel 20. A track 21 is provided at the lowest position in the center of the tunnel 20, and the first circuit 13 and the second circuit 15 are arranged running in the vertical direction on the right and left sides of the track 21. Over the track 21 is provided the reserve circuit 14. The reserve circuit 14 is filled with, for example, an $SF_6$ gas 18 and contains a center conductor 19 in the central portion thereof.

Described below is a case where ground fault has occurred on the first circuit 13 in the gas-insulated power transmission line 12. In this case, the circuit breaker 4 is opened, the line disconnecting switch 1 is opened, and the bus disconnecting switch 7 is opened to disconnect the first circuit 13 on which accident has occurred. Then, the line disconnecting switch 2 is closed, the change-over disconnecting switch 9 is closed and the circuit breaker 5 is closed. Thus, the reserve circuit 14 is connected in place of the first circuit 13, and it is allowed to continue the operation despite the occurrence of ground fault.

When ground fault occurs on the second circuit 15, the circuit breaker 6 is opened, the line disconnecting switch 3 is opened and the bus disconnecting switch 8 is opened, in the same manner as described above, to disconnect the second circuit 15 on which ground fault has occurred. Next, the line disconnecting switch 2 is closed, the change-over disconnecting switch 10 is closed and the circuit breaker 5 is closed. Thus, the reserve circuit 14 is connected instead of the second circuit 15, and it is allowed to continue the operation despite the occurrence of ground fault. Thus, even when ground fault occurs on the first circuit 13 and/or the second circuit 15, provision of the reserve circuit makes it possible to continue the operation.

In order to improve reliability in transmitting the electric power of the reserve circuit 14, furthermore, the electric power is transmitted through the reserve circuit 14 not only at the time of accident but also regularly by regularly changing over the circuits. In this case, the circuits are changed over in the same manner as the case of changing over the circuit on which ground fault has occurred as described above. That is, the first circuit 13 or the second circuit 15 which is transmitting the electric power is changed over to the reserve circuit.

Here, as required, the tank diameter D of the tank 14*a* of the reserve circuit 14 is set to be larger than the tank diameter d of the tank 13*a* of the first circuit 13, and also larger than the tank diameter d of the tank 15*a* of the second circuit 15, in order to improve insulating performance in the tank and to enhance reliability. Furthermore, the pressure 14 of the insulating gas in the tank 14*a* of the reserve circuit 14 is elevated to be higher than the pressure P13, P15 of the insulating gas in the tanks 13*a*, 15*a* of the first circuit 13 and the second circuit 15, respectively, in order to improve insulating performance and reliability.

A pressure differential may be imparted between the pressure 13*a* of the insulating gas in the first circuit 13 and the pressure P15 of the insulating gas in the second circuit 15. In this case, the circuit having a higher insulating gas pressure exhibits improved insulating performance and enhanced reliability.

Moreover, the reserve circuit 14 may be used as a reserve tank to recover the insulating gas 18 from the circuit on which grounding fault is occurring. For this purpose, the reserve circuit 14 is maintained at low pressure or in a vacuum by a conventional evacuating means 24. By using the reserve circuit 14 as a reserve tank as described above, the insulating gas in the circuit on which an accident has occurred can be once transferred into the reserve circuit 14, making it possible to easily and quickly cope with the occurrence of accident.

The method of transmitting the electric power may be either that the electric power is transmitted by half through each of the first circuit 13 and the second circuit 15 or that the electric power is sent by 100% through one of the circuits. According to this embodiment, the circuit on which an accident has occurred is changed over to a normal transmission circuit. Accordingly, even when, for example, a ground fault occurs on a first circuit and occurs again on a second circuit, the probability of power failure is reduced substantially to zero and the electric power is safely supplied.

What is claimed is:

1. A gas-insulated transmission circuit for transmitting electric power, comprising:
    a first circuit, a second circuit and a reserve circuit, wherein said reserve circuit and said first circuit are connected together via a first change-over disconnecting switch, and said reserve circuit and said second circuit are connected together via a second change-over disconnecting switch;
    wherein the pressure of the insulating gas in said reserve circuit is higher than the pressure of the insulating gas in said first circuit and said second circuit, and wherein there is a pressure differential between the first circuit and the second circuit.

2. A gas-insulated transmission line according to claim 1, wherein said first circuit and said second circuit are, respectively, connected to a main bus via a line disconnecting switch, a circuit breaker and a bus disconnecting switch, and said reserve circuit is connected, via the line disconnecting switch, circuit breaker and change-over disconnecting switch, to a branch bus between the bus disconnecting switch and the circuit breaker for said first and second circuits.

3. A gas-insulated transmission line according to claim 1, wherein said reserve circuit has a tank diameter that is larger than a tank diameter of said first circuit and larger than a tank diameter of said second circuit.

4. A gas-insulated transmission line according to claim 1, wherein the pressure of the insulating gas in said first circuit is different from the pressure of the insulating gas in said second circuit.

5. A gas-insulated transmission circuit for transmitting electric power, comprising:
    a first circuit, a second circuit and a reserve circuit, wherein said reserve circuit and said first circuit are connected together via a first change-over disconnecting switch, and said reserve circuit and said second circuit are connected together via a second change-over disconnecting switch;
    wherein the pressure of the insulating gas in said reserve circuit is lower than the pressure of the insulating gas in said first circuit and said second circuit, thereby recovering the insulating gas from any of the first and second circuits if a fault occurs in either of said first and second circuits by opening the change-over disconnecting switch to which the faulty circuit is connected.

6. A gas-insulated transmission line according to claim 5, wherein said first circuit and said second circuit are, respectively, connected to a main bus via a line disconnecting switch, a circuit breaker and a bus disconnecting switch, and said reserve circuit is connected, via the line disconnecting switch, circuit breaker and change-over disconnecting switch, to a branch bus between the bus disconnecting switch and the circuit breaker for said first and second circuits.

7. A gas-insulated transmission line according to claim 5, wherein said reserve circuit has a tank diameter that is larger than a tank diameter of said first circuit and larger than a tank diameter of said second circuit.

8. A gas-insulated transmission line according to claim 5, wherein the pressure of the insulating gas in said first circuit is different from the pressure of the insulating gas in said second circuit.

9. A gas-insulated transmission circuit for transmitting electric power, comprising:
    a first circuit, a second circuit and a reserve circuit, wherein said reserve circuit and said first circuit are connected together via a first change-over disconnecting switch, and said reserve circuit and said second circuit are connected together via a second change-over disconnecting switch; and
    means for maintaining said reserve circuit in a vacuum.

10. A gas-insulated transmission line according to claim 9, wherein said first circuit and said second circuit are, respectively, connected to a main bus via a line disconnecting switch, a circuit breaker and a bus disconnecting switch, and said reserve circuit is connected, via the line disconnecting switch, circuit breaker and change-over disconnecting switch, to a branch bus between the bus disconnecting switch and the circuit breaker for said first and second circuits.

11. A gas-insulated transmission line according to claim 9, wherein said reserve circuit has a tank diameter that is larger than a tank diameter of said first circuit and larger than a tank diameter of said second circuit.

12. A gas-insulated transmission line according to claim 9, wherein the pressure of the insulating gas in said first circuit is different from the pressure of the insulating gas in said second circuit.

* * * * *